(12) United States Patent
Hosomi

(10) Patent No.: US 9,465,838 B2
(45) Date of Patent: Oct. 11, 2016

(54) NUMERIC RANGE SEARCH DEVICE, NUMERIC RANGE SEARCH METHOD, AND NUMERIC RANGE SEARCH PROGRAM

(75) Inventor: Itaru Hosomi, Tokyo (JP)

(73) Assignee: NEC CORPORATION, Tokyo (JP)

( * ) Notice: Subject to any disclaimer, the term of this patent is extended or adjusted under 35 U.S.C. 154(b) by 347 days.

(21) Appl. No.: 14/124,778

(22) PCT Filed: May 21, 2012

(86) PCT No.: PCT/JP2012/003300
§ 371 (c)(1),
(2), (4) Date: Jan. 23, 2014

(87) PCT Pub. No.: WO2012/176374
PCT Pub. Date: Dec. 27, 2012

(65) Prior Publication Data
US 2014/0156670 A1 Jun. 5, 2014

(30) Foreign Application Priority Data
Jun. 21, 2011 (JP) .................................. 2011-137663

(51) Int. Cl.
*G06F 17/30* (2006.01)

(52) U.S. Cl.
CPC ..... *G06F 17/30424* (2013.01); *G06F 17/3066* (2013.01); *G06F 17/30321* (2013.01); *G06F 17/30616* (2013.01)

(58) Field of Classification Search
CPC ................................................. G06F 17/30424
USPC ....................................................... 707/741
See application file for complete search history.

(56) References Cited

U.S. PATENT DOCUMENTS 6,038,561 A * 3/2000 Snyder .............. G06F 17/30011
6,065,001 A * 5/2000 Ohkubo .............. G06F 17/3071
707/700

(Continued)

FOREIGN PATENT DOCUMENTS

JP H5-6398 A 1/1993
JP 2001-297095 A 10/2001

(Continued)

OTHER PUBLICATIONS

Das et al., Suitability Study of Discretization Methods for Associative Classifiers, 2010, 3 pages.*

(Continued)

*Primary Examiner* — Noosha Arjomandi

(57) ABSTRACT

A numeric range search device includes: interval index storage means for storing, for numeric ranges to be searched, an interval index that is made up of records each including at least an interval filter and reference information and in which the records are organized in units of records whose interval filters are at least partially common, the interval filter being data indicating a correspondence relationship between an input numeric value or numeric range and subintervals obtained by dividing a range including all of the numeric ranges by a predetermined boundary value, and the reference information being information for referring to a numeric range to be searched; interval query generation means for generating an interval query which is data indicating a correspondence relationship between the input numeric value or numeric range and the subintervals; and candidate selection means for selecting, from the records, a record for which an AND of an interval filter included in the record and the interval query is equal to the interval query.

13 Claims, 8 Drawing Sheets

(56) References Cited

U.S. PATENT DOCUMENTS

| | | | | |
|---|---|---|---|---|
| 2003/0014414 | A1* | 1/2003 | Newman | G06F 17/30867 |
| 2007/0174238 | A1* | 7/2007 | Sareen | G06F 17/30864 |
| 2012/0191708 | A1* | 7/2012 | Barsony | G06Q 10/00 707/737 |
| 2013/0159289 | A1* | 6/2013 | Matthews | G06F 17/30424 707/722 |
| 2013/0262852 | A1* | 10/2013 | Roeder | G06F 21/602 713/150 |
| 2014/0133651 | A1* | 5/2014 | Furukawa | H04L 9/008 380/44 |
| 2014/0207831 | A1* | 7/2014 | Ohyama | G06F 17/30312 707/812 |

FOREIGN PATENT DOCUMENTS

| | | |
|---|---|---|
| JP | 3360617 B2 | 12/2002 |
| JP | 2006-163995 A | 6/2006 |
| JP | 2006-350989 A | 12/2006 |
| JP | 2008-276550 A | 11/2008 |
| JP | 2009-48352 A | 3/2009 |

OTHER PUBLICATIONS

"MeCab: Yet Another Part-of-Speech and Morphological Analyzer", [Internet] <URL:http://mecab.sourceforge.net/>, retrieved on Sep. 27, 2009. See cited doc on p. 21, paragraph [0057] of translated Applicant's Specification for explanation of relevance.

"CaboCha: Yet Another Japanese Dependency Structure Analyzer", [Internet] <URL:http://chasen.org/~taku/software/cabocha/ >, retrieved on Nov. 26, 2005. See cited doc on p. 21, paragraph [0057] of translated Applicant's Specification for explanation of relevance.

International Search Report for PCT Application No. PCT/JP2012/003300, mailed on Jun. 12, 2012.

* cited by examiner (a)

(b)

NUMERIC RANGE TABLE

| NUMERIC RANGE ID | MINIMUM VALUE | MAXIMUM VALUE | DOCUMENT ID |
|---|---|---|---|
| 0001 | -inf | -10 | D001 |
| 0002 | 0.03 | 1.89 | D002 |
| 0003 | 1.5 | 1.5 | D002 |
| 0004 | 0.2 | 0.6 | D003 |
| 0005 | 100 | +inf | D003 |
| 0006 | 0 | 90 | D004 |
| 0007 | 52000 | +inf | D004 |

~100

SUBINTERVAL DEFINITION

| SUBINTERVAL ID | LOWER LIMIT | UPPER LIMIT |
|---|---|---|
| Z01 | -inf | 0 |
| Z02 | 0 | 1 |
| Z03 | 1 | 100 |
| Z04 | 100 | +inf |

~101

INTERVAL INDEX

| SUBINTERVAL ID | INTERVAL FILTER | NUMERIC RANGE ID |
|---|---|---|
| Z01 | 1000 | 0001 |
| Z02 | 0110 | 0002 |
| Z02 | 0100 | 0004 |
| Z02 | 0110 | 0006 |
| Z03 | 0110 | 0002 |
| Z03 | 0010 | 0003 |
| Z03 | 0110 | 0006 |
| Z04 | 0001 | 0005 |
| Z04 | 0001 | 0007 |

~102

INTERVAL INDEX 103

| SUBINTERVAL ID | INTERVAL FILTER | NUMERIC RANGE ID |
|---|---|---|
| Z01 | 1000 | 0001 |
| Z02 | 0110 | 0006,0002 |
| Z02 | 0100 | 0004 |
| Z03 | 0110 | 0006,0002 |
| Z03 | 0010 | 0003 |
| Z04 | 0001 | 0005 |

FIG. 10

DOCUMENT INDEX 104

| NUMERIC RANGE ID | DOCUMENT ID | OBJECT WORD | NUMERIC TYPE | POSITION |
|---|---|---|---|---|
| 0001 | D001 | SUISHIN (WATER DEPTH) | LENGTH (m) | 2/251 |
| 0002 | D002 | HAICHI KANKAKU (PLACEMENT SPACING) | LENGTH (m) | 8/15 |
| 0004 | D003 | SHIO (SALT) | WEIGHT (g) | 1/8 |
| 0006 | D004 | ONDO (TEMPERATURE) | TEMPERATURE (°C) | 19/103 |
| 0002 | D002 | HAICHI KANKAKU (PLACEMENT SPACING) | LENGTH (m) | 8/15 |
| 0003 | D002 | SENHABA (LINE WIDTH) | LENGTH (m) | 42/312 |
| 0006 | D004 | ONDO (TEMPERATURE) | TEMPERATURE (°C) | 19/103 |
| 0005 | D003 | JUREI (TREE AGE) | TIME (NEN (YEAR)) | 1/8 |
| 0007 | D004 | TAIJU (BODY WEIGHT) | WEIGHT (g) | 33/20 |

FIG. 11

INTERVAL INDEX /105

| SUBINTERVAL ID | INTERVAL FILTER | NUMERIC RANGE ID | MINIMUM VALUE | MAXIMUM VALUE | DOCUMENT ID | OBJECT WORD | NUMERIC TYPE | POSITION |
|---|---|---|---|---|---|---|---|---|
| Z01 | 1000 | 0001 | -inf | -10 | D001 | SUISHIN (WATER DEPTH) | LENGTH (m) | 2/251 |
| Z02 | 0110 | 0002 | 0.03 | 1.89 | D002 | HAICHI KANKAKU (PLACEMENT SPACING) | LENGTH (m) | 8/15 |
| Z02 | 0100 | 0004 | 0.2 | 0.6 | D003 | SHIO (SALT) | WEIGHT (g) | 1/8 |
| Z02 | 0110 | 0006 | 0 | 90 | D004 | ONDO (TEMPERATURE) | TEMPERATURE (°C) | 19/103 |
| Z03 | 0110 | 0002 | 0.03 | 1.89 | D002 | HAICHI KANKAKU (PLACEMENT SPACING) | LENGTH (m) | 8/15 |
| Z03 | 0010 | 0003 | 1.5 | 1.5 | D002 | SENHABA (LINE WIDTH) | LENGTH (m) | 42/312 |
| Z03 | 0110 | 0006 | 0 | 90 | D004 | ONDO (TEMPERATURE) | TEMPERATURE (°C) | 19/103 |
| Z04 | 0001 | 0005 | 100 | +inf | D003 | JUREI (TREE AGE) | TIME (NEN (YEAR)) | 1/8 |
| Z04 | 0001 | 0007 | 52000 | +inf | D004 | TAIJU (BODY WEIGHT) | WEIGHT (g) | 33/20 |

NUMERIC RANGE SEARCH DEVICE, NUMERIC RANGE SEARCH METHOD, AND NUMERIC RANGE SEARCH PROGRAM

This application is a National Stage Entry of PCT/JP2012/003300 filed on May 21, 2012, which claims priority from Japanese Patent Application 2011-137663 filed on Jun. 21, 2011, the contents of all of which are incorporated herein by reference, in their entirety.

TECHNICAL FIELD

The present invention relates to a numeric range search device, a numeric range search method, and a numeric range search program.

BACKGROUND ART

When performing quantitatively constrained work such as designing industrial products, synthesizing chemical substances, or prescribing drugs in medicine, search means for searching for a document in which rules or guidelines including acceptable numeric ranges for the work are written is important to quickly and comprehensively refer to the rules or guidelines. In such a document, numeric ranges are not necessarily written in a fixed format like a list of minimum and maximum values, but written in various expressions in a plurality of parts of the document using a natural language.

In the case of searching for a document using one or more numeric values or ranges as criteria, a typical keyword search system or full-text search system cannot comprehensively obtain a document conforming to the criteria. For example, in the case where "10 g" is used as the criteria, a document in which "greater than or equal to 10 g and less than or equal to 15 g" is written can be retrieved, but a document in which "greater than or equal to 5 g and less than or equal to 20 g" is written cannot be retrieved because the document does not include the character string "10 g" despite the numeric range conforming to the criteria.

Patent Literature (PTL) 1 discloses an index generation system that adds information for numeric range search to an index for full-text search. In this system, an exponential part of a numeric value in a document is computed and an index in which the exponential part is added to a part of the elements constituting the index is generated, thus enabling numeric range search and full-text search to be performed by the same mechanism without preparing special information (another independent index) for numeric range search.

For example, in a document including a numeric range "380 m to 760 m", "380" and "760" are expressed as ("38", [18 (+2)]), ("80", [19]) and ("76", [22 (+2)]), ("60", [23]) using each combination of a 2-gram character string (character string of two consecutive characters), an appearance position, and an exponential part (only for the first 2-gram of each numeric value), and stored in a word index.

In the case of performing full-text search on this document using "greater than or equal to 387.6 m" as search criteria, "387.6" in the search criteria is divided into "38" and "7.6". Their exponents are respectively +2 and −1. These are compared with the exponential parts in the word index, and each record with a greater or equal exponential part (because "greater than or equal to" is included in the criteria) is extracted as a candidate. Since the search criteria in the above-mentioned example include "greater than or equal to", a number of a value greater than the number in the search criteria is a match (in the case of the same exponent). The numeric values in the above-mentioned document that are "greater than or equal to" the first value ("38", [0 (+2)]) in the search criteria are ("38", [18 (+2)]) and ("76", [22 (+2)]), as a result of magnitude relationship comparison for each of the numeric value character string and the exponential part. Likewise, the values that are "greater than or equal to" the value ("7.6") other than the first value are ("80", [19]) and ("60", [23]). Concatenation determination means determines, for example, that ("76", [22 (+2)]) and ("60", [23]) are concatenated to form the value "760", so that "760 (m)" is recognized as a value satisfying "greater than or equal to 387.6 m".

In a method described in PTL 2, for a set D of numeric values of data of a specific type, a set E of numeric intervals including all elements of D is generated, and numeric values in a document are indexed by assigning 1 to an interval including an element x of D and assigning 0 to an interval not including the element x. Such an index is generated for each data type, to achieve accurate and efficient search for numeric data in the document.

For example, consider the case of searching for data of other patients similar in condition to a patient A, where one of the search criteria is that the systolic blood pressure of the patient A is 140. Both a patient B whose systolic blood pressure is 125 and a patient C whose systolic blood pressure is 155 are equally close in blood pressure to the patient A. However, since the patient B is in an interval of normal blood pressure whereas the patients A and C are in an interval of high blood pressure, they need to be distinguished.

The method described in PTL 2 can improve the search accuracy in such an example, by distinguishing the numeric interval corresponding to the numeric value set of normal blood pressure and the numeric interval corresponding to the numeric value set of abnormal blood pressure (high blood pressure). A potential improvement in search efficiency is also suggested on the ground that, as a result of separating the numeric intervals, the similarity to the search criteria only needs to be evaluated for documents in which numeric values included in the corresponding numeric interval are written.

CITATION LIST

Patent Literature(s)

PTL 1: Japanese Patent Application Laid-Open No. 2006-163995

PTL 2: Japanese Patent Application Laid-Open No. 2008-276550

SUMMARY OF INVENTION

Technical Problem

In the above-mentioned conventional search methods using numeric ranges as criteria, a numeric value or numeric range included in a search sentence is compared with individual numeric ranges included in searched documents. Therefore, a search through a large number of documents or through a document including a large number of pieces of numeric data takes time.

In the method described in PTL 2, there is a possibility of an improvement in search efficiency by limiting the comparison range by the separation of intervals for each numeric data type (e.g. blood pressure, age). However, the separation of intervals is based on such a purpose of classification that separates a normal interval and an abnormal interval, without taking into account how many numeric values written in searched documents are included in which interval. This does not necessarily improve the search efficiency.

Accordingly, the present invention has an object of providing a numeric range search device, a numeric range search method, and a numeric range search program for efficiently comparing numeric ranges written in documents with search criteria.

Solution to Problem

A numeric range search device according to the present invention is a numeric range search device for searching for data including a numeric range that satisfies a predetermined conformance condition for an input numeric value or numeric range, each numeric range being a range of numeric values that is defined using at least one of a minimum value and a maximum value, the numeric range search device including: interval index storage means for storing, for numeric ranges to be searched, an interval index that is made up of records each including at least an interval filter and reference information and in which the records are organized in units of records whose interval filters are at least partially common, the interval filter being data indicating a correspondence relationship between the input numeric value or numeric range and subintervals obtained by dividing a range including all of the numeric ranges by a predetermined boundary value, and the reference information being information for referring to a numeric range to be searched; interval query generation means for generating an interval query which is data indicating a correspondence relationship between the input numeric value or numeric range and the subintervals; and candidate selection means for selecting, from the records, a record for which an AND of an interval filter included in the record and the interval query is equal to the interval query.

A numeric range search method according to the present invention is a numeric range search method for searching for data including a numeric range that satisfies a predetermined conformance condition for an input numeric value or numeric range, each numeric range being a range of numeric values that is defined using at least one of a minimum value and a maximum value, the numeric range search method including: storing, for numeric ranges to be searched, an interval index that is made up of records each including at least an interval filter and reference information and in which the records are organized in units of records whose interval filters are at least partially common, the interval filter being data indicating a correspondence relationship between the input numeric value or numeric range and subintervals obtained by dividing a range including all of the numeric ranges by a predetermined value, and the reference information being information for referring to a numeric range to be searched; generating an interval query which is data indicating a correspondence relationship between the input numeric value or numeric range and the subintervals; and selecting, from the records, a record for which an AND of an interval filter included in the record and the interval query is equal to the interval query.

A numeric range search program according to the present invention is a numeric range search program for searching for data including a numeric range that satisfies a predetermined conformance condition for an input numeric value or numeric range, each numeric range being a range of numeric values that is defined using at least one of a minimum value and a maximum value, the numeric range search program causing a computer that stores in an interval index storage unit, for numeric ranges to be searched, an interval index that is made up of records each including at least an interval filter and reference information and in which the records are organized in units of records whose interval filters are at least partially common, the interval filter being data indicating a correspondence relationship between the input numeric value or numeric range and subintervals obtained by dividing a range including all of the numeric ranges by a predetermined value, and the reference information being information for referring to a numeric range to be searched, to execute: an interval query generation process of generating an interval query which is data indicating a correspondence relationship between the input numeric value or numeric range and the subintervals; and a candidate selection process of selecting, from the records, a record for which an AND of an interval filter included in the record and the interval query is equal to the interval query.

Advantageous Effects of Invention

According to the present invention, it is possible to efficiently compare numeric ranges written in documents with search criteria.

BRIEF DESCRIPTION OF DRAWINGS

FIG. 10 is a diagram showing a specific example of a document index in the present invention.

FIG. 11 is a diagram showing another specific example of an interval index in the present invention.

DESCRIPTION OF EMBODIMENTS

The following describes exemplary embodiments of the present invention with reference to drawings.

Exemplary Embodiment 1

Figure 1:
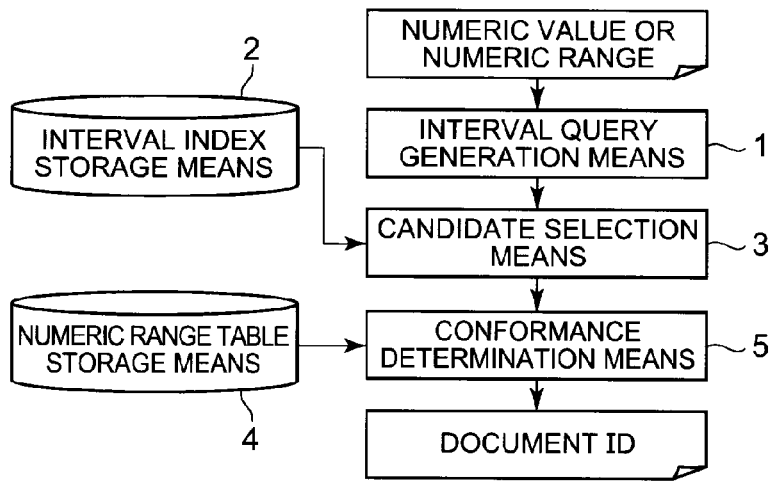
FIG. 1 is a block diagram showing an example of a structure in Exemplary Embodiment 1 of the present invention.

FIG. 1 is a block diagram showing Exemplary Embodiment 1 of a numeric range search device according to the present invention. As shown in FIG. 1, the numeric range search device includes interval query generation means 1, interval index storage means 2, candidate selection means 3, numeric range table storage means 4, and conformance determination means 5.

The interval query generation means 1 generates binary data (hereafter referred to as "interval query") indicating a correspondence relationship between an input numeric value or numeric range and subintervals that are obtained by dividing a one-dimensional real number space at predetermined positions and are each defined by a lower limit and an upper limit.

The interval index storage means 2 stores an interval index represented by records each of which includes: a numeric range ID for specifying a document in which a numeric range is written and a position at which the numeric range is written; binary data (hereafter referred to as "interval filter") indicating a correspondence relationship between the numeric range in the document and the subintervals; and an ID of a subinterval whose lower limit is smallest of subintervals corresponding to the numeric range in the document. That is, the interval index storage means 2 stores an interval index that is made up of records each including at least an interval filter and reference information (e.g. numeric range ID) for referring to a numeric range to be searched and in which the records are organized in units of records whose interval filters are at least partially common.

The candidate selection means 3 selects all records in the interval index for each of which the AND of the interval filter included in the record and the interval query is equal to the interval query, and outputs the numeric range ID included in each selected record to the conformance determination means 5 situated downstream.

The numeric range table storage means 4 stores a numeric range table represented by records each of which includes: a minimum value and a maximum value of a numeric range specified by a numeric range ID; and a document ID for specifying a document in which the numeric range is written.

The conformance determination means 5 compares, with the input numeric value or numeric range, the minimum value and the maximum value included in the record having the numeric range ID received from the candidate selection means 3 from among the records in the numeric range table, and determines whether or not the numeric range in the document designated by the document ID in the record conforms to the input numeric value or numeric range.

For example, in the case where the numeric range in the document contains the input numeric value or numeric range, the conformance determination means 5 determines that the numeric range in the document conforms to the input numeric value or numeric range. The conformance determination means 5 as a result outputs the document ID included in the record determined as conforming. With the use of an additionally prepared index (not shown) in which document IDs are associated with document names, document filenames, and the like, the document in which the numeric range conforming to the input numeric value or numeric range is written can be referred to based on the document ID output from the conformance determination means 5.

Figure 12:
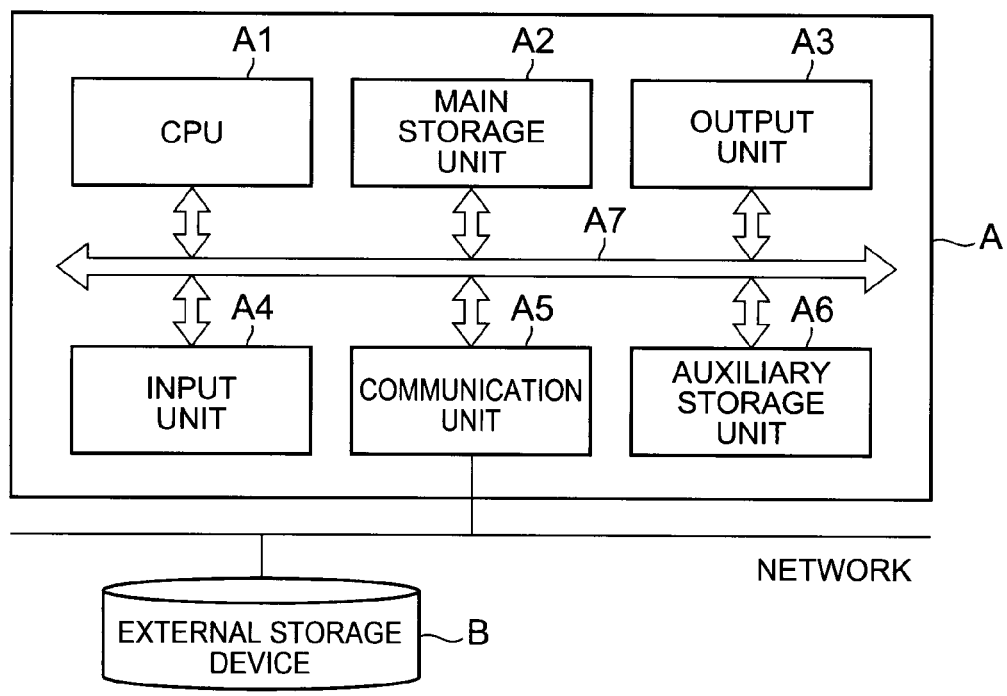
FIG. 12 is a diagram for describing an example of a hardware structure in Exemplary Embodiments 1 and 2 of the present invention.

Exemplary Embodiment 1 of the numeric range search device according to the present invention can be realized by the same hardware structure as a typical computer device shown in FIG. 12. In FIG. 12, a numeric range search device A includes at least a CPU (Central Processing Unit) A1, a main storage unit A2, an output unit A3, an input unit A4, and an auxiliary storage unit A6. The numeric range search device A may also include a communication unit A5.

The main storage unit A2 is a main memory such as a RAM (Random Access Memory), and is used as a work area for data or a temporary save area for data. The output unit A3 is a display device such as a liquid crystal display device or a printing device such as a printer, and has a function of outputting data. The input unit A4 is an input device such as a keyboard and a mouse, and has a function of inputting data. In the case of inputting data by file reading, the input unit A4 may be an external recording medium reading device or the like. The auxiliary storage unit A6 is a ROM (Read Only Memory), a hard disk device, or the like. The structural elements A1 to A6 described above are connected to each other via a system bus A7, as shown in FIG. 12.

In the hardware structure in FIG. 12, the auxiliary storage unit A6 in the numeric range search device A stores various programs for searching for a document ID based on a numeric value or a numeric range input using the input unit A4. Programs for realizing the interval query generation means 1, the candidate selection means 3, and the conformance determination means 5 shown in FIG. 1 are all stored in the auxiliary storage unit A6. The auxiliary storage unit A6 can also realize the interval index storage means 2 and the numeric range table storage means 4 shown in FIG. 1, by storing the interval index and the numeric range table.

The numeric range search device may be realized by hardware, by implementing in its inside a circuit made up of hardware components such as LSI (Large Scale Integration) in which the programs for realizing the functions shown in FIG. 1 are installed. Alternatively, as shown in FIG. 12, the numeric range search device may be realized by software, by causing the CPU A1 in the computer to execute the programs for providing the functions shown in FIG. 1. That is, the CPU A1 loads the programs stored in the auxiliary storage unit A6 into the main storage unit A2 and executes the programs, to control the operation of the numeric range search device A. The above-mentioned functions can thus be realized by software.

The communication unit A5 is connected to peripheral devices, and has a function of transmitting and receiving data. As one of the peripheral devices, an external storage device B shown in FIG. 12 may be connected to the numeric range search device A by the communication unit A5 via a network, where the external storage device B stores the interval index and the numeric range table or stores the document ID output from the conformance determination means 5.

Figure 2:
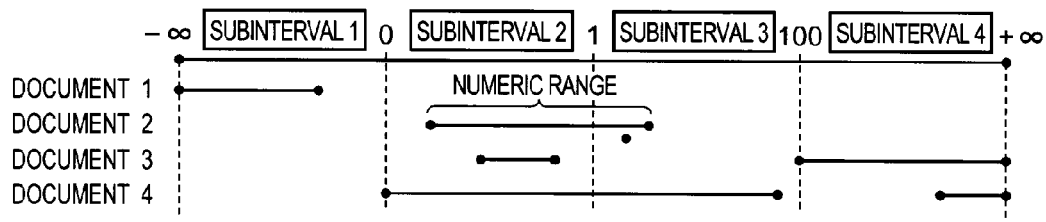
FIG. 2 is a diagram showing a specific example of subintervals and a numeric range table in the present invention.
Figures 3, 4, 5:
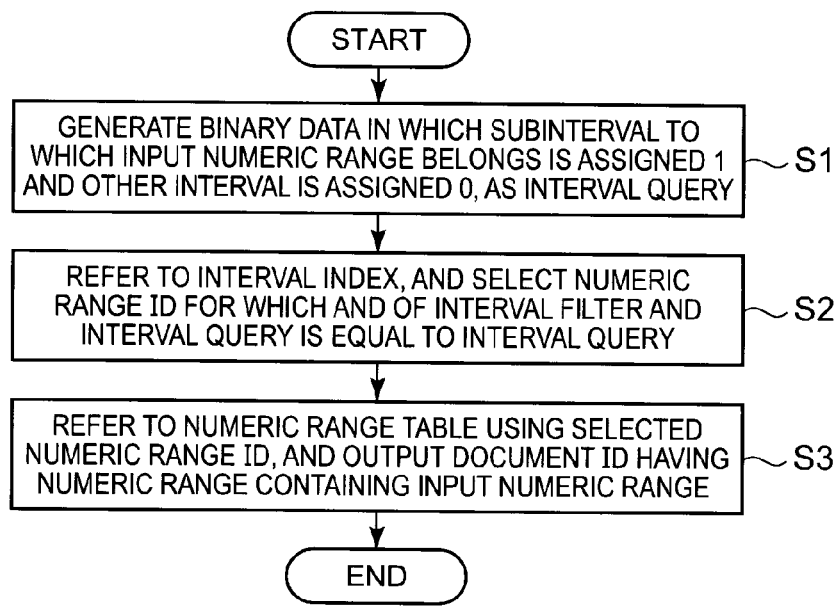
FIG. 3 is a diagram showing a specific example of a subinterval definition in the present invention.
FIG. 4 is a diagram showing a specific example of an interval index in the present invention.
FIG. 5 is a flowchart for describing an example of an operation in Exemplary Embodiment 1.

The following describes the interval index stored in the interval index storage means 2 in more detail, with reference to FIGS. 2 and 4. In FIG. 2(a), a one-dimensional real number space whose range is from $-\infty$ (negative infinity) to $+\infty$ (positive infinity) is divided into four subintervals (subintervals 1, 2, 3, and 4). Boundary values between adjacent subintervals are 0, 1, and 100. Each subinterval includes a boundary value as its lower limit, and does not include a boundary value as its upper limit. For example, the subinterval 2 includes 0 as its lower limit and does not include 1 as its upper limit, and is defined as an interval greater than or equal to 0 and less than 1.

As the subinterval determination method, there is a method of selecting boundary values between subintervals so that, from among all numeric ranges written in all documents to be searched, as many numeric ranges not overlapping each other as possible are separated from each other (i.e. are not included in a common subinterval). By employing this method, a numeric range search according to the present invention can be executed at higher speed. A specific procedure is as follows. First, a boundary value that can separate a largest number of numeric ranges is selected to generate two subintervals. Next, a boundary value that can separate a largest number of numeric ranges is selected in each subinterval, to generate new subintervals. This operation is repeated until a predetermined condition is satisfied (e.g. 10 subintervals are generated, or there are no more numeric ranges that can be separated), as a result of which the subintervals are determined.

In FIG. 2(a), numeric ranges written in each document are expressed as line segments in the real number space. A single independent numeric value is regarded as a numeric range whose minimum value and maximum value are equal to each other, and expressed as a line segment of 0 in length. For example, suppose a numeric range "less than or equal to −10" is written in a document 1 (document ID=D001) which is one of the documents to be searched. This numeric range is (−∞, −10), which is included in the subinterval 1 whose range is (−∞, 0) from among the above-mentioned four subintervals and does not correspond to the other subintervals 2 to 4. Here, a subinterval to which a numeric value or a part or whole of a numeric range corresponds is assigned 1, a subinterval to which a numeric value or a part or whole of a numeric range does not correspond is assigned 0, and 4-digit binary data in which the subintervals are arranged in order of ascending distance from −∞ is referred to as "interval filter". Since the numeric range "less than or equal to −10" in the document 1 corresponds to only the subinterval 1, its interval filter is "1000".

A numeric range table 100 shown in FIG. 2(b) is an example of indicating, for each of the numeric ranges written in the documents, the ID of the numeric range, the minimum value and maximum value of the numeric range, and the ID of the document in which the numeric range is written. An interval index 102 shown in FIG. 4 is generated from such a numeric range table 100 and stored in the interval index storage means 2 beforehand.

In FIG. 3, a subinterval definition 101 is a table defining the lower limit and upper limit of each of the four subintervals shown in FIG. 2(a). Each subinterval is identified by a subinterval ID (Z01 to Z04).

The interval index 102 in FIG. 4 is an example of organizing the numeric ranges in the numeric range table 100 in FIG. 2(b) by the subinterval IDs, where the record of each numeric range is made up of the subinterval ID of the corresponding subinterval, the interval filter, and the numeric range ID for referring to the actual numeric range. In the case where one numeric range corresponds to two or more subintervals, a plurality of records for the same numeric range are included in the interval index 102.

The following describes a procedure of searching for a document (document ID) conforming to an input numeric value or numeric range, with reference to FIG. 5. FIG. 5 is a flowchart for describing an example of an operation in Exemplary Embodiment 1.

For example, in the case where only one numeric value "0.04" is input to the numeric range search device, first the interval query generation means 1 compares the numeric value with the subinterval definition 101 shown in FIG. 3 to determine in which subinterval the numeric value is included. The numeric value "0.04" is included in the interval 2 that is greater than or equal to 0 and less than 1, and is not included in the other intervals. Accordingly, the numeric value "0.04" can be expressed by 4-digit binary data "0100" in which the four subintervals defined in the subinterval definition 101 are arranged in order of ascending lower limit. The interval query generation means 1 converts the above-mentioned numeric value to the binary data "0100", and outputs the binary data to the candidate selection means 3 as an interval query, together with the input numeric value and the corresponding subinterval ID (=Z02) (step S1).

Next, the candidate selection means 3 refers to the interval index 102 in FIG. 4 stored in the interval index storage means 2, and computes the AND of the interval filter (Fi where i denotes the numeric range ID) in each record having the subinterval ID (Z02 in this example) corresponding to the input numeric value and the above-mentioned interval query (=Q1). The candidate selection means 3 then outputs a list of the minimum value, the maximum value, and the document ID in each record of the numeric range ID=i satisfying Q1^ Fi=Q1 (where ^ is an AND operator), to the conformance determination means 5 (step S2). In the above-mentioned example, the interval query is "0100", and the interval filters of the records whose subinterval IDs are Z02 in the interval index 102 are "0110", "0100", and "0110". Since all ANDs are equal to "0100", i.e. the value of the interval query, the numeric range IDs "0002", "0004", and "0006" are output to the conformance determination means 5.

Next, the conformance determination means 5 compares, with the input numeric value, the minimum value and the maximum value in each record of the above-mentioned numeric range ID=i in the numeric range table 100, and outputs a document ID of a document in which a numeric range to which the numeric value belongs is written (step S3).

Figures 6, 7:
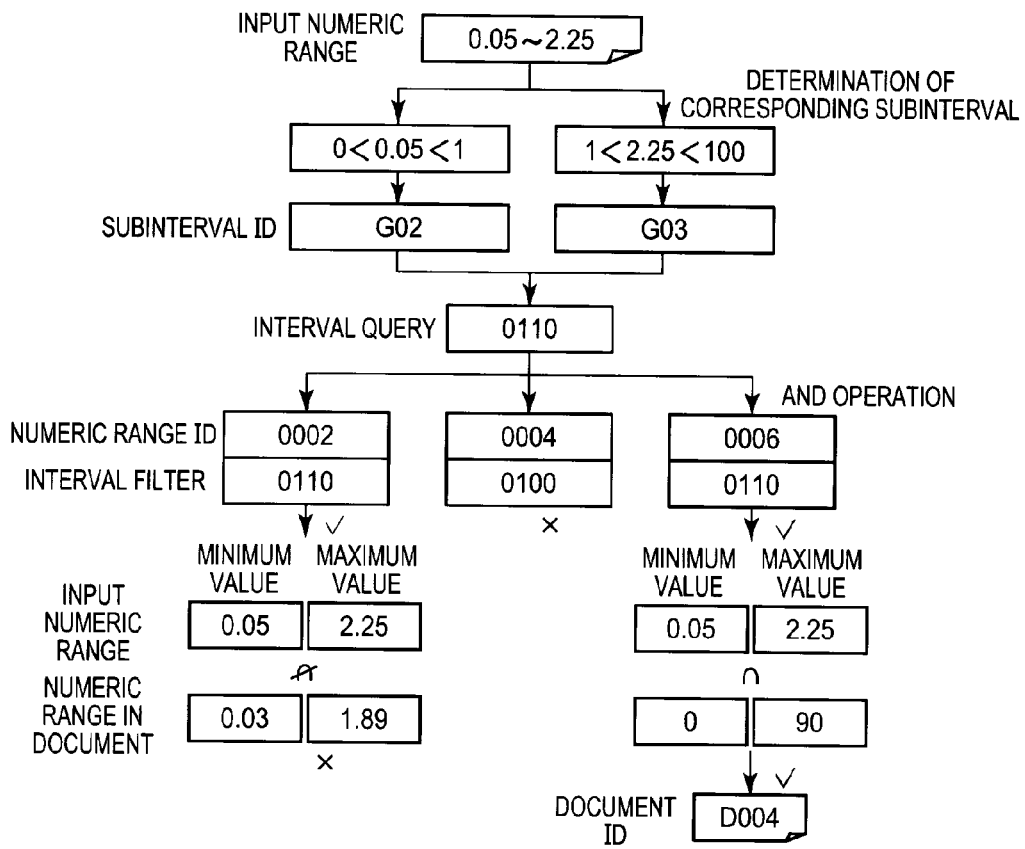
FIG. 6 is an explanatory diagram showing a specific example of an operation in Exemplary Embodiment 1.
FIG. 7 is a diagram showing another specific example of an interval index in the present invention.

The following describes, as another operation example, an operation in the case where a numeric range made up of two numeric values is input to the numeric range search device as search criteria, with reference to FIG. 6. FIG. 6 is an explanatory diagram showing a specific example of an operation in Exemplary Embodiment 1.

Suppose the input numeric range is "0.05 to 2.25", i.e. the minimum value is 0.05 and the maximum value is 2.25. 0.05 is included in the subinterval 2 (subinterval ID=Z02), and 2.25 is included in the subinterval 3 (subinterval ID=Z03). There is no other subinterval between the subintervals 2 and 3. Therefore, the input numeric range corresponds to the subintervals 2 and 3. The interval query generation means 1 in this operation example accordingly generates an interval query "0110".

Next, the candidate selection means 3 computes the AND of the interval filter in each record corresponding to the subinterval 2 (subinterval ID=Z02) whose lower limit is smallest of the subintervals corresponding to the above-mentioned input numeric range and the above-mentioned interval query, from the interval index 102 shown in FIG. 4. The candidate selection means 3 then extracts only each record for which the AND is equal to the interval query. The numeric range IDs of the extracted records are "0002" and "0006" (in FIG. 6, the extracted numeric range IDs are each marked with a tick, and the numeric range ID not extracted is marked with a cross).

Following this, the conformance determination means 5 refers to the numeric range table 100 in FIG. 2(b) using the extracted two numeric range IDs, and compares the minimum value and maximum value of the numeric range corresponding to each numeric range ID with the minimum value and maximum value of the input numeric range. The minimum value and maximum value of the input numeric range are respectively "0.05" and "2.25", whereas the combinations of minimum and maximum values to be compared are "0.03" and "1.89", and "0" and "90". Of these combinations of minimum and maximum values to be compared, the former combination does not contain the input numeric range but the latter combination contains the input numeric range, as shown in FIG. 6. The conformance determination means 5 accordingly outputs only the document ID=D004 corresponding to the latter numeric range, as the search result by the numeric range search device.

In the interval index, numeric range IDs corresponding to the same interval filter value may be grouped as one record, as in an interval index 103 shown in FIG. 7. The structure of the interval index shown in FIG. 7 enables the number of records in the interval index to be reduced. This contributes to a smaller amount of storage for the interval index, and faster record selection by the candidate selection means 3.

Moreover, the containment relationship between numeric ranges corresponding to the same interval filter value may be determined beforehand so that the numeric range ID of the contained numeric range is associated with the numeric range ID of the containing numeric range. For example, of the values in the numeric range ID field in the interval index 103 in FIG. 7, the numeric range indicated by the numeric range ID "0002" is contained in the numeric range indicated by the numeric range ID "0006". Hence, "0002 (0006)" is set in the numeric range ID field in the interval index 103. If the input numeric range is contained in the numeric range ID "0002", the conformance determination means 5 can determine that the input numeric range is also contained in the numeric range ID "0006", without actually comparing the numeric ranges. Thus, by defining the order of comparison between numeric ranges based on their containment relationship for each subinterval, it is possible to instantly recognize that, if the input numeric range is contained in one numeric range, the input numeric range is also contained in all numeric ranges that contain the above-mentioned one numeric range.

In Exemplary Embodiment 1 of the present invention, the numeric range search device performs coarse classification for the input numeric value or numeric range based on the correspondence relationship with the subintervals beforehand. The numeric range search device then narrows down the numeric ranges whose minimum and maximum values both belong to the same subinterval from among the numeric ranges written in the documents to be searched, through the AND operation between short binary data which can be processed by a computer at high speed. The search result can be obtained merely by comparing the input numeric value or numeric range and the narrowed-down numeric ranges. Thus, the numeric range search device can search a large number of documents or a very large number of numeric ranges for conformance to an input numeric value or numeric range at high speed.

Exemplary Embodiment 2

Figure 8:
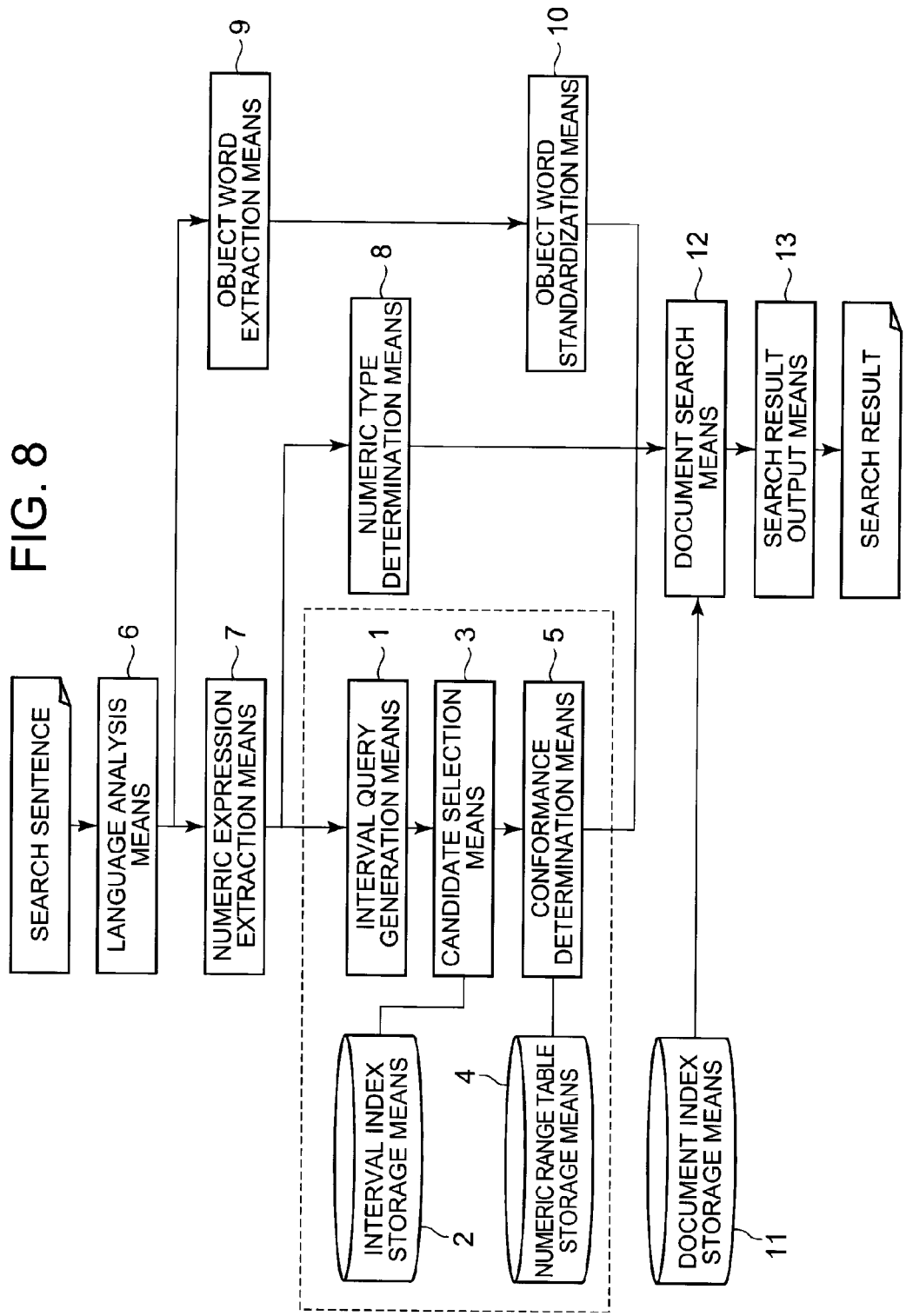
FIG. 8 is a block diagram showing an example of a structure in Exemplary Embodiment 2 of the present invention.

The following describes Exemplary Embodiment 2 of the present invention with reference to drawings. FIG. 8 is a block diagram showing Exemplary Embodiment 2 of the numeric range search device according to the present invention. The interval query generation means 1, the interval index storage means 2, the candidate selection means 3, the numeric range table storage means 4, and the conformance determination means 5 in Exemplary Embodiment 2 shown in FIG. 8 have the same functions as those in Exemplary Embodiment 1 shown in FIG. 1, and so their description is omitted. In Exemplary Embodiment 2, however, the conformance determination means 5 outputs not a document ID but a numeric range ID. Hence, the document ID in the numeric range table stored in the numeric range table storage means 4 may be omitted in Exemplary Embodiment 2.

A search sentence written in a natural language such as Japanese is input in Exemplary Embodiment 2. In FIG. 8, language analysis means 6 analyzes the input search sentence, and identifies words and modification relationships between the words.

Numeric expression extraction means 7 extracts a combination of words representing a numeric value, a unit, and the like relating to numeric expressions, from the set of identified words.

Numeric type determination means 8 determines which type of numeric quantity such as length or weight (hereafter referred to as "numeric type") the extracted numeric expressions relate to.

Object word extraction means 9 extracts an object word for specifying for what the extracted numeric expressions represent the numeric quantity.

Object word standardization means 10 converts, in the case where a plurality of object words indicate the same object, the extracted object word to a standard object word.

Document index storage means 11 stores a document index made up of records each of which includes at least a numeric type, an object word, and a numeric range ID and a document ID used in Exemplary Embodiment 1.

Document search means 12 refers to the document index stored in the document index storage means 11 using the numeric range ID, the numeric type, and the standardized object word, and extracts at least the document ID from a record that satisfies a predetermined condition.

Search result output means 13 outputs the search result including at least the extracted document ID.

The language analysis means 6 can be realized by using existing language analysis means to analyze the search sentence written in the natural language and identify the words and the modification relationships between the words. For example, MeCab (e.g. described in http://mecab.sourceforge.net/) may be used to identify various words from a Japanese sentence, and CaboCha (e.g. described in http://chasen.org/~taku/software/cabocha/) to identify the modification relationships between the words.

The numeric expression extraction means 7 can be realized by using, for example, a method disclosed in PTL 3 (Japanese Patent No. 3360617) or a method disclosed in PTL 4 (Japanese Patent Application Laid-Open No. 2006-350989) to extract the documents to be searched from the set of words, and extract the numeric expressions from the search sentence.

The numeric type determination means 8 can be realized by preparing a dictionary (not shown) in which, for example, "g", "mg", "lb", "wt", and the like are associated with the type name "weight" and "m", "cm", "feet", "distance", "width", and the like are associated with the type name "length", in order to determine the numeric type.

The object word extraction means 9 can be realized by preparing an object word dictionary (not shown) and searching the words identified by the language analysis means 6 for a word whose character string matches that of an object word. The object word dictionary may be generated, for example, by collecting nouns situated near numeric values in the documents to be searched.

The object word standardization means 10 can be realized by preparing a dictionary (not shown) indicating correspondence relationships between object words and standard object words and replacing the object word with the standard object word. The dictionary may be generated, for example, by collecting synonyms or near-synonyms of nouns using the following reference literature or the like and setting one of them as a standard object word.

Reference literature (Japanese thesaurus: synonym dictionary, LogoVista Corporation (http://www.logovista.co.jp/LVERP/shop/ItemDetail.aspx?contents_code=LVDTS05010)).

In the document search means 12, the predetermined condition to be evaluated may be that all of the numeric range ID, the numeric type, and the object word obtained from the input search sentence are included, or that the numeric type and the object word obtained from the input search sentence are included but the numeric range ID is different. Other conditions are applicable, too.

Exemplary Embodiment 2 of the present invention can be realized by the same hardware structure as in Exemplary Embodiment 1 shown in FIG. 12. The functions of the language analysis means 6, the numeric expression extraction means 7, the numeric type determination means 8, the object word extraction means 9, the object word standardization means 10, the document search means 12, and the search result output means 13 can be realized by software, by reading corresponding programs stored in the auxiliary storage unit A6 in FIG. 12 into the main storage unit A2 and executing the programs by the CPU A1 according to need. Alternatively, these structural elements may be realized by hardware, as described in Exemplary Embodiment 1. The document index storage means 11 can be realized by storing the document index in the auxiliary storage unit A6 in FIG. 12 or by storing the document index in the external storage device B and referring to the document index via the communication unit A5 and the network according to need.

Figure 9:
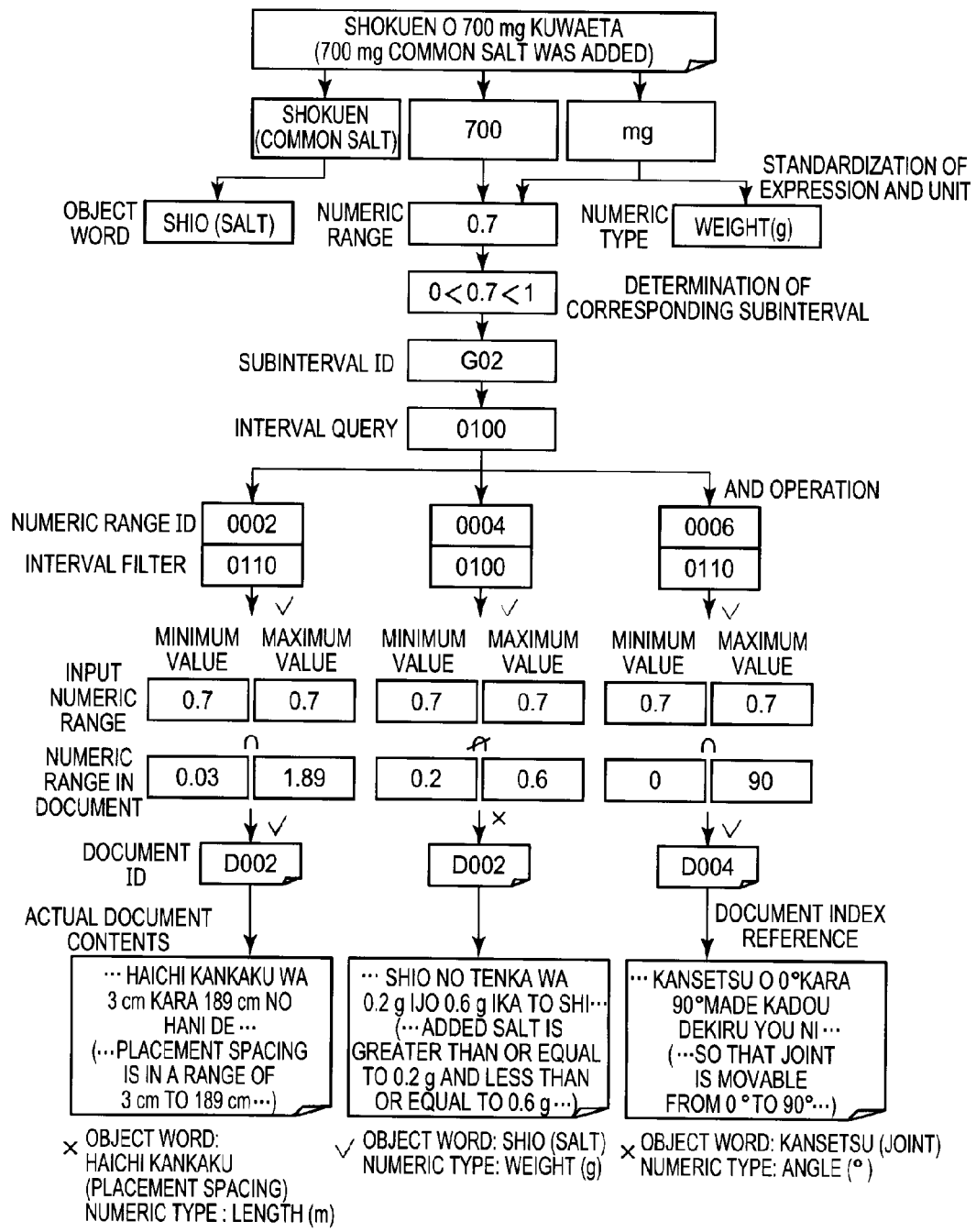
FIG. 9 is an explanatory diagram showing a specific example of an operation in Exemplary Embodiment 2.

The following describes a specific example of an operation in Exemplary Embodiment 2 of the present invention, with reference to FIGS. 9 and 10.

Suppose a Japanese sentence "shokuen o 700 mg kuwaeta" (700 mg common salt was added) is input as a search sentence. The language analysis means 6 analyzes the input Japanese sentence, and identifies the words "shokuen", "o", "700", "mg", and "kuwaeta". The language analysis means 6 further recognizes the modification relationship that "shokuen" (common salt) and the combination of "700" and "mg" modify "kuwaeta" (added).

The numeric expression extraction means 7 extracts any word relating to a numeric expression from the identified words. In this example, the numeric expression extraction means 7 extracts "700" as a numeric value and "mg" as a unit. The numeric expression extraction means 7 also standardizes the unit "mg" to a standard unit "g", and performs a numeric conversion required for this standardization by replacing "700" with "0.7" which is a thousandth part of "700".

The numeric type determination means 8 determines the numeric type from the extracted unit. In this example, the numeric type determination means 8 determines the numeric type as "weight (g)" from the standardized unit "g".

The object word extraction means 9 extracts an object word corresponding to the numeric expressions "700" and "mg" ("0.7" and "g" after standardization), from the analysis result of the language analysis means 6. In this example, the object word extraction means 9 extracts "shokuen" (common salt) that modifies "kuwaeta" (added) together with the numeric expressions "700" and "mg", as the object word.

The object word standardization means 10 checks whether not there is a standard expression (standard object word) for the object word "shokuen" (common salt) with reference to a dictionary (not shown) and, if there is the standard expression, replaces the object word "shokuen" (common salt) with the standard expression. For example, suppose "shio" (salt) is included in the dictionary as a standard expression for "shokuen" (common salt). The object word standardization means 10 then changes the object word from "shokuen" (common salt) to "shio" (salt).

Only a numeric value or a numeric range from among the numeric expressions extracted by the numeric expression extraction means 7 and standardized is input to the interval query generation means 1. In this example, the interval query generation means 1 receives "0.7" as input, and refers to the subinterval definition 101 shown in FIG. 3. Since the input corresponds to only the subinterval 2 (subinterval ID=Z02) whose lower limit is 0 and upper limit is 1, the interval query generation means 1 generates an interval query "0100".

Following this, the candidate selection means 3 refers to the interval index 102 in FIG. 4 using the interval index storage means 2, and selects each record of the subinterval ID=Z02 for which the AND of the interval filter and the interval query "0100" is equal to the interval query. In this example, the records of the numeric range IDs "0002", "0004", and "0006" are all selected. The conformance determination means 5 refers to the numeric ranges in the numeric range table 100 in FIG. 2(b) stored in the numeric range table storage means 4 using these numeric range IDs, and compares each numeric range with the input numeric value "0.7" to determine whether or not a predetermined condition is satisfied. In this example, the predetermined condition is that the input numeric value or numeric range is contained in the numeric range corresponding to the designated numeric range ID. Note that, in this example, the conformance determination means 5 outputs all designated numeric range IDs together with their determination results of whether or not the predetermined condition is satisfied. In this example, the result of comparison between the input numeric value "0.7" and each of the numeric ranges of the numeric range IDs "0002", "0004", and "0006" in the numeric range table 100 indicates that "0.7" is contained in the numeric ranges of the numeric range IDs "0002" and "0006" and is not contained in the numeric range of the numeric range ID "0004", as shown in FIG. 9.

The document search means 12 refers to the document index stored in the document index storage means 11, using the above-mentioned determination result by the conformance determination means 5, the numeric type "weight (g)", and the object word "shio" (salt).

The document index storage means 11 stores a document index 104 as shown in FIG. 10. The document index 104 is made up of records each of which includes not only a numeric range ID, a document ID, an object word, and a numeric type but also a position (the page number and the number of characters from the page start to the first character corresponding to the numeric range) at which the numeric range is written in the document.

Referring to the document index 104 reveals that, of the records corresponding to the numeric range IDs "0002", "0004", and "0006", only the record corresponding to "0004" has the object word "shio" (salt) and the numeric type "weight (g)". However, the numeric value "0.7" obtained from the input Japanese sentence is not contained in the numeric range of the numeric range ID "0004", as shown in FIG. 9. Accordingly, the search result output means 13 may perform an operation of outputting no data on the ground that there is no search result for the input Japanese sentence as the search criteria, or output the document ID and the position in the record with the matching object word and numeric type, together with a message that the numeric range is not conforming. Moreover, the actual document contents with the matching object word and numeric type may be output as shown in the bottom part of FIG. 9, by referring to an actual document from an additionally prepared table (not shown) associating document IDs and actual documents using the document ID and the position in the record with the matching object word and numeric type, specifying the part in which the numeric range is written in the document according to the position, and extracting a character string of a predetermined length from the specified part. In this example, " . . . shio no tenka wa 0.2 g ijo 0.6 g ika to shi . . . " ( . . . added salt is greater than or equal to 0.2 g and less than or equal to 0.6 g . . . ) is output, with it being possible to recognize that the input Japanese sentence "shokuen o 700 mg kuwaeta" (700 mg common salt was added) is not included in the numeric range in the document.

In Exemplary Embodiment 2 of the present invention, from the search sentence written in the natural language, the document or the description of the specific part in the document conforming to the numeric value or numeric range included in the search sentence, the numeric type, and the object word can be searched for at high speed. Besides, whether or not the numeric value or numeric range included in the above-mentioned search sentence is contained in the numeric range in the document conforming to the object word and numeric type included in the search sentence can be determined at high speed.

Though the search sentence written in the natural language is used as input data in Exemplary Embodiment 2, a string of mutually related words such as "shokuen 700 mg" may instead be used as input data in the present invention. Another exemplary embodiment of the present invention where such a word string is input data can be realized by the same structure as shown in the block diagram in FIG. 8 except that the language analysis means 6 is omitted.

In Exemplary Embodiment 2, the interval index may be made up of records each of which includes all of a subinterval ID, an interval filter, a numeric range ID, a minimum value, a maximum value, a document ID, an object word, a numeric type, and a position as in an interval index 105 shown in FIG. 11. In this case, the numeric range search device need not include the numeric range table storage means 4 and the document index storage means 11 because the candidate selection means 3, the conformance determination means 5, and the document search means 12 all refer to the interval index storage means 2.

Figure 13:
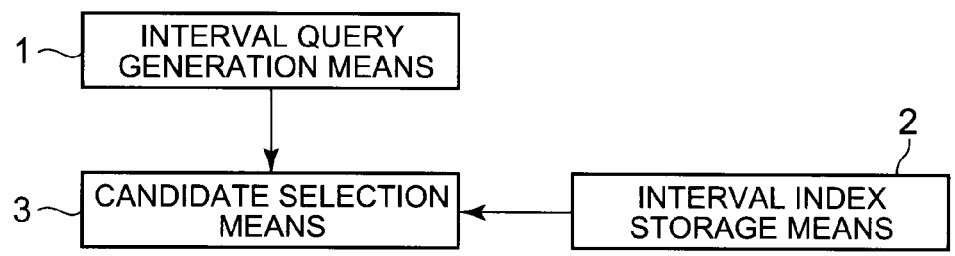
FIG. 13 is a block diagram showing an example of a minimum structure of a numeric range search device.

The following describes a minimum structure of the numeric range search device according to the present invention. FIG. 13 is a block diagram showing an example of a minimum structure of a numeric range search device for searching for data including a numeric range that satisfies a predetermined conformance condition for an input numeric value or numeric range, each numeric range being a range of numeric values that is defined using at least one of a minimum value and a maximum value. As shown in FIG. 13, the numeric range search device includes interval index storage means 2, interval query generation means 1, and candidate selection means 3, as minimum structural elements.

In the numeric range search device of the minimum structure shown in FIG. 13, the interval index storage means 2 stores, for numeric ranges to be searched, an interval index that is made up of records each including at least an interval filter and reference information and in which the records are organized in units of records whose interval filters are at least partially common, the interval filter being data indicating a correspondence relationship between the input numeric value or numeric range and subintervals obtained by dividing a range including all of the numeric ranges by a predetermined boundary value, and the reference information being information for referring to a numeric range to be searched. The interval query generation means 1 generates an interval query which is data indicating a correspondence relationship between the input numeric value or numeric range and the subintervals. The candidate selection means 3 selects, from the records, a record for which an AND of an interval filter included in the record and the interval query is equal to the interval query.

Therefore, the numeric range search device of the minimum structure can search documents in which numeric ranges are written for a document conforming to an input numeric value or numeric range, at high speed with a smaller number of numeric value reference operations.

Note that the characteristic structures of the numeric range search device as in the following (1) to (5) are shown in this exemplary embodiment.

(1) The numeric range search device is a numeric range search device for searching for data including a numeric range that satisfies a predetermined conformance condition for an input numeric value or numeric range, each numeric range being a range of numeric values that is defined using at least one of a minimum value and a maximum value, the numeric range search device including: interval index storage means (e.g. realized by the interval index storage means 2) for storing, for numeric ranges to be searched, an interval index that is made up of records each including at least an interval filter and reference information and in which the records are organized in units of records whose interval filters are at least partially common, the interval filter being data indicating a correspondence relationship between the input numeric value or numeric range and subintervals obtained by dividing a range including all of the numeric ranges by a predetermined boundary value, and the reference information being information for referring to a numeric range to be searched; interval query generation means (e.g. realized by the interval query generation means 1) for generating an interval query which is data indicating a correspondence relationship between the input numeric value or numeric range and the subintervals; and candidate selection means (e.g. realized by the candidate selection means 3) for selecting, from the records, a record for which an AND of an interval filter included in the record and the interval query is equal to the interval query.

(2) In the numeric range search device, the predetermined conformance condition may be that the input numeric value or numeric range is contained in the numeric range to be searched.

(3) In the numeric range search device, the predetermined boundary value may be determined by repeatedly performing, until a predetermined end condition is satisfied, a process of: selecting, in an interval containing all of the numeric ranges to be searched, a value that separates a largest number of numeric ranges not overlapping each other as a boundary value to generate subintervals; and selecting, in each of the generated subintervals, a value that separates a largest number of numeric ranges not overlapping each other as a boundary value to further generate subintervals.

(4) In the numeric range search device, the interval index storage means may store the interval index in which pieces of reference information corresponding to a same interval filter value are included in one record and, from among two or more pieces of reference information included in one record, pieces of reference information for referring to numeric ranges between which a containment relationship holds are included in a form indicating the containment relationship.

(5) The numeric range search device may include conformance determination means (e.g. realized by the conformance determination means 5) for comparing the input numeric value or numeric range and a numeric range included in a document specified by reference information included in the selected record, and outputting the document satisfying the predetermined conformance condition as a search result.

Though the present invention has been described with reference to the above exemplary embodiments and examples, the present invention is not limited to the above exemplary embodiments and examples. Various changes understandable by those skilled in the art can be made to the structures and details of the present invention within the scope of the present invention.

This application claims priority based on Japanese Patent Application No. 2011-137663 filed on Jun. 21, 2011, the disclosure of which is incorporated herein in its entirety.

INDUSTRIAL APPLICABILITY

According to the present invention, a function capable of comparing various numeric values included in hardware or software designs with quantitative constraints or recommended ranges written in documents of related rules or guidelines can be implemented in a PLM (Product Lifecycle Management) system or the like. The present invention is also applicable to a medical information search system capable of quickly searching a large number of electronic medical charts, medial articles, and the like for information related to patients having specific test values, medical records, or drug dosage.

REFERENCE SIGNS LIST

1 interval query generation means
2 interval index storage means
3 candidate selection means
4 numeric range table storage means
5 conformance determination means
6 language analysis means
7 numeric expression extraction means
8 numeric type determination means
9 object word extraction means
10 object word standardization means
11 document index storage means
12 document search means
13 search result output means
100 numeric range table
101 subinterval definition
102 interval index
103 interval index
104 document index
105 interval index
A numeric range search device
A1 CPU
A2 main storage unit
A3 output unit
A4 input unit
A5 communication unit
A6 auxiliary storage unit
A7 system bus
B external storage device

The invention claimed is:

1. A numeric range search device for searching for data including a numeric range that satisfies a predetermined conformance condition for an input numeric value or numeric range, each numeric range being a range of numeric values that is defined using at least one of a minimum value and a maximum value, the numeric range search device comprising:
    a processor,
    a storage unit functioning as an interval index storage unit which stores, for numeric ranges to be searched, an interval index that is made up of records each including at least an interval filter and reference information and in which the records are organized in units of records whose interval filters are at least partially common, the interval filter being data indicating a correspondence relationship between the input numeric value or numeric range and subintervals obtained by dividing a range including all of the numeric ranges by a predetermined boundary value, and the reference information being information for referring to a numeric range to be searched;
    an interval query generation unit, implemented by the processor, which generates an interval query which is data indicating a correspondence relationship between the input numeric value or numeric range and the subintervals; and
    a candidate selection unit, implemented by the processor, which selects, from the records, a record for which an AND of an interval filter included in the record and the interval query is equal to the interval query.

2. The numeric range search device according to claim 1, wherein the predetermined conformance condition is that the input numeric value or numeric range is contained in the numeric range to be searched.

3. The numeric range search device according to claim 2, wherein the predetermined boundary value is determined by repeatedly performing, until a predetermined end condition is satisfied, a process of: selecting, in an interval containing all of the numeric ranges to be searched, a value that separates a largest number of numeric ranges not overlapping each other as a boundary value to generate subintervals; and selecting, in each of the generated subintervals, a value that separates a largest number of numeric ranges not overlapping each other as a boundary value to further generate subintervals.

4. The numeric range search device according to claim 2, wherein the interval index storage unit stores the interval index in which pieces of reference information corresponding to a same interval filter value are included in one record and, from among two or more pieces of reference information included in one record, pieces of reference information for referring to numeric ranges between which a containment relationship holds are included in a form indicating the containment relationship.

5. The numeric range search device according to claim 2, further comprising:
    a conformance determination unit, implemented by the processor, which compares the input numeric value or numeric range and a numeric range included in a document specified by reference information included in the selected record, and outputting the document satisfying the predetermined conformance condition as a search result.

6. The numeric range search device according to claim 1, wherein the predetermined boundary value is determined by repeatedly performing, until a predetermined end condition is satisfied, a process of: selecting, in an interval containing all of the numeric ranges to be searched, a value that separates a largest number of numeric ranges not overlapping each other as a boundary value to generate subintervals; and selecting, in each of the generated subintervals, a value that separates a largest number of numeric ranges not overlapping each other as a boundary value to further generate subintervals.

7. The numeric range search device according to claim 6, wherein the interval index storage unit stores the interval index in which pieces of reference information corresponding to a same interval filter value are included in one record and, from among two or more pieces of reference information included in one record, pieces of reference information for referring to numeric ranges between which a containment relationship holds are included in a form indicating the containment relationship.

8. The numeric range search device according to claim 6, further comprising:
 a conformance determination unit, implemented by the processor, which compares the input numeric value or numeric range and a numeric range included in a document specified by reference information included in the selected record, and outputting the document satisfying the predetermined conformance condition as a search result.

9. The numeric range search device according to claim 1, wherein the interval index storage unit stores the interval index in which pieces of reference information corresponding to a same interval filter value are included in one record and, from among two or more pieces of reference information included in one record, pieces of reference information for referring to numeric ranges between which a containment relationship holds are included in a form indicating the containment relationship.

10. The numeric range search device according to claim 9, further comprising:
 a conformance determination unit, implemented by the processor, which compares the input numeric value or numeric range and a numeric range included in a document specified by reference information included in the selected record, and outputting the document satisfying the predetermined conformance condition as a search result.

11. The numeric range search device according to claim 1, further comprising:
 a conformance determination unit, implemented by the processor, which compares the input numeric value or numeric range and a numeric range included in a document specified by reference information included in the selected record, and outputting the document satisfying the predetermined conformance condition as a search result.

12. A computer-implemented numeric range search method for searching for data including a numeric range that satisfies a predetermined conformance condition for an input numeric value or numeric range, each numeric range being a range of numeric values that is defined using at least one of a minimum value and a maximum value, the numeric range search method comprising:
 storing, in a storage unit functioning as an interval index storage unit, for numeric ranges to be searched, an interval index that is made up of records each including at least an interval filter and reference information and in which the records are organized in units of records whose interval filters are at least partially common, the interval filter being data indicating a correspondence relationship between the input numeric value or numeric range and subintervals obtained by dividing a range including all of the numeric ranges by a predetermined value, and the reference information being information for referring to a numeric range to be searched;
 generating, by a processor, an interval query which is data indicating a correspondence relationship between the input numeric value or numeric range and the subintervals; and
 selecting, by the processor, from the records, a record for which an AND of an interval filter included in the record and the interval query is equal to the interval query.

13. A non-transitory computer readable information recording medium storing a numeric range search program for searching for data including a numeric range that satisfies a predetermined conformance condition for an input numeric value or numeric range, each numeric range being a range of numeric values that is defined using at least one of a minimum value and a maximum value, when executed by a processor that stores in an interval index storage unit functioning an interval index storage unit, for numeric ranges to be searched, an interval index that is made up of records each including at least an interval filter and reference information and in which the records are organized in units of records whose interval filters are at least partially common, the interval filter being data indicating a correspondence relationship between the input numeric value or numeric range and subintervals obtained by dividing a range including all of the numeric ranges by a predetermined value, and the reference information being information for referring to a numeric range to be searched, performs a method comprising:
 generating an interval query which is data indicating a correspondence relationship between the input numeric value or numeric range and the subintervals; and
 selecting, from the records, a record for which an AND of an interval filter included in the record and the interval query is equal to the interval query.

\* \* \* \* \*